No. 618,059. Patented Jan. 24, 1899.
L. C. CROWELL & T. M. NORTH.
TYMPAN SHIFTING MECHANISM.
(Application filed Mar. 16, 1897.)
(No Model.) 9 Sheets—Sheet 1.
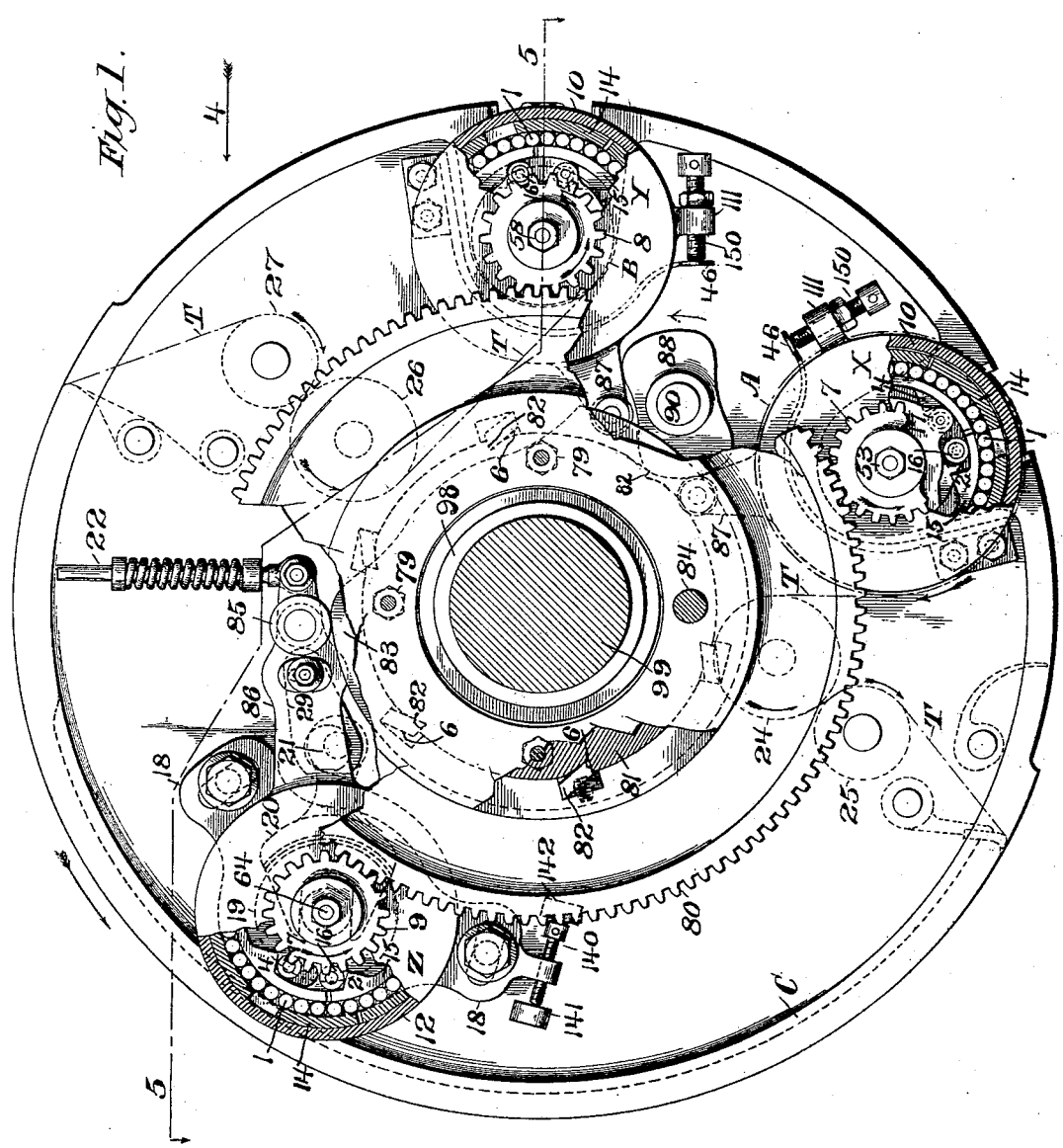

No. 618,059. Patented Jan. 24, 1899.
L. C. CROWELL & T. M. NORTH.
TYMPAN SHIFTING MECHANISM.
(Application filed Mar. 16, 1897.)
(No Model.) 9 Sheets—Sheet 2.
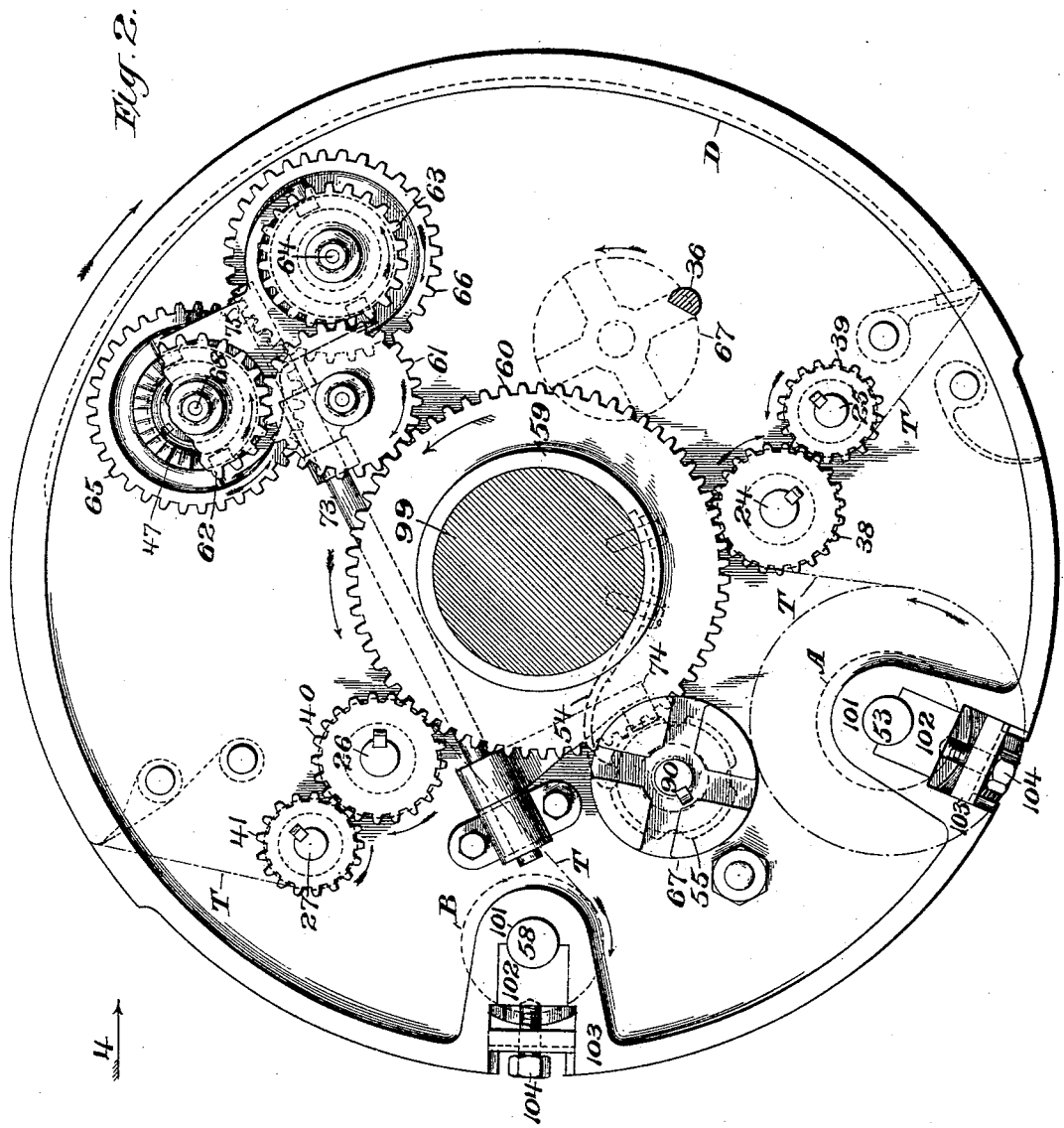

No. 618,059. Patented Jan. 24, 1899.
L. C. CROWELL & T. M. NORTH.
TYMPAN SHIFTING MECHANISM.
(Application filed Mar. 10, 1897.)
(No Model.) 9 Sheets—Sheet 3.

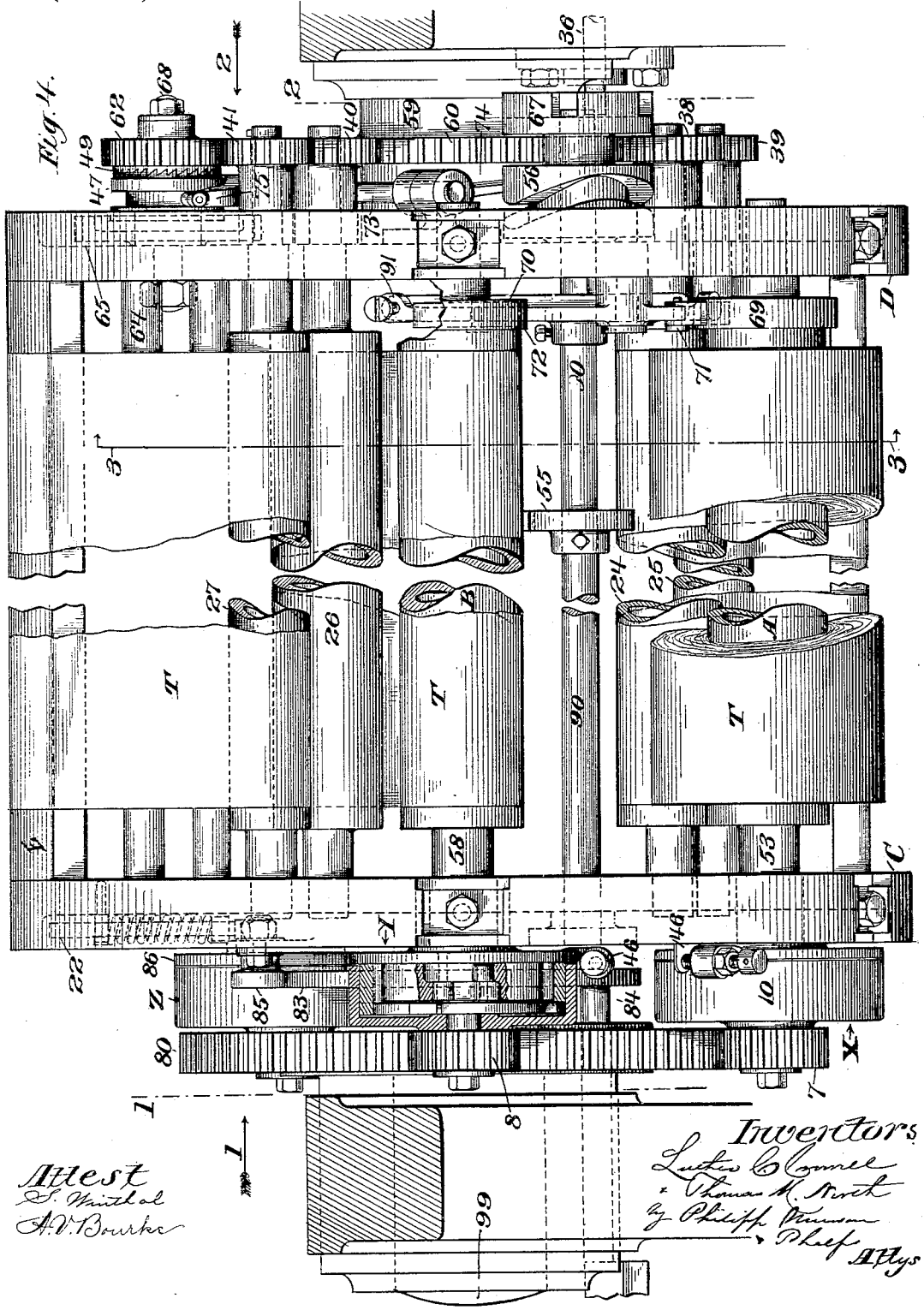

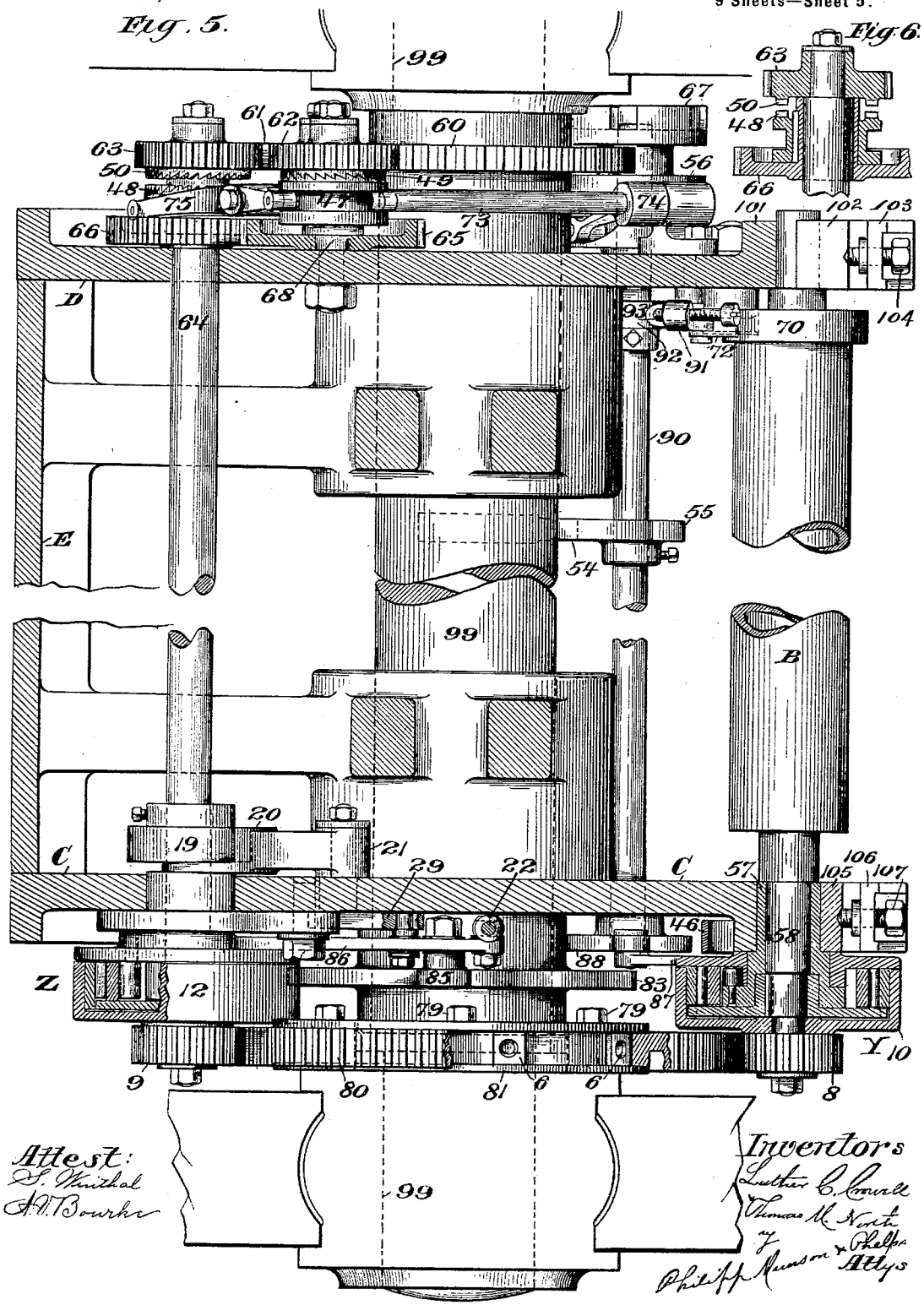

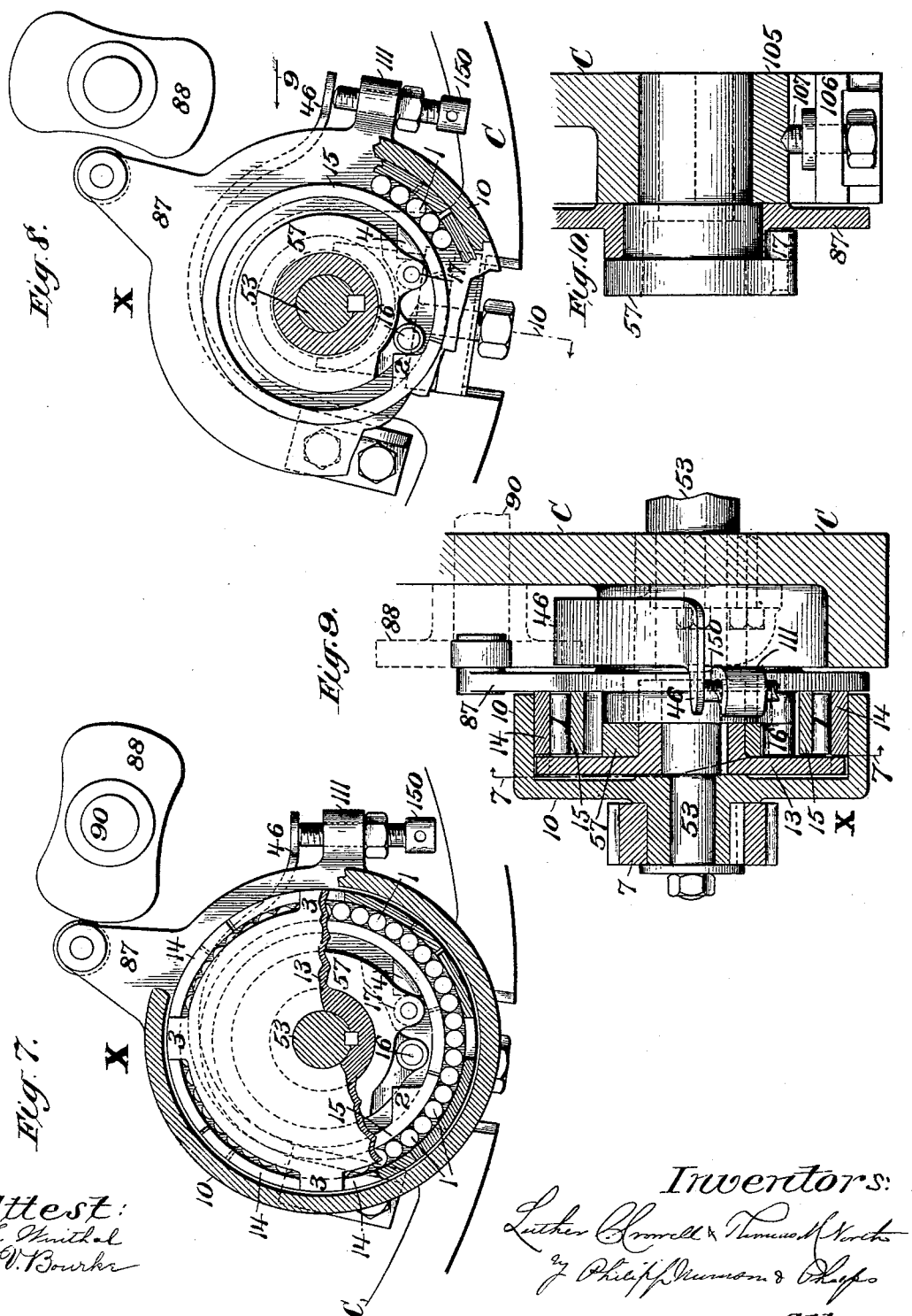

No. 618,059. Patented Jan. 24, 1899.
L. C. CROWELL & T. M. NORTH.
TYMPAN SHIFTING MECHANISM.
(Application filed Mar. 16, 1897.)
(No Model.) 9 Sheets—Sheet 7.
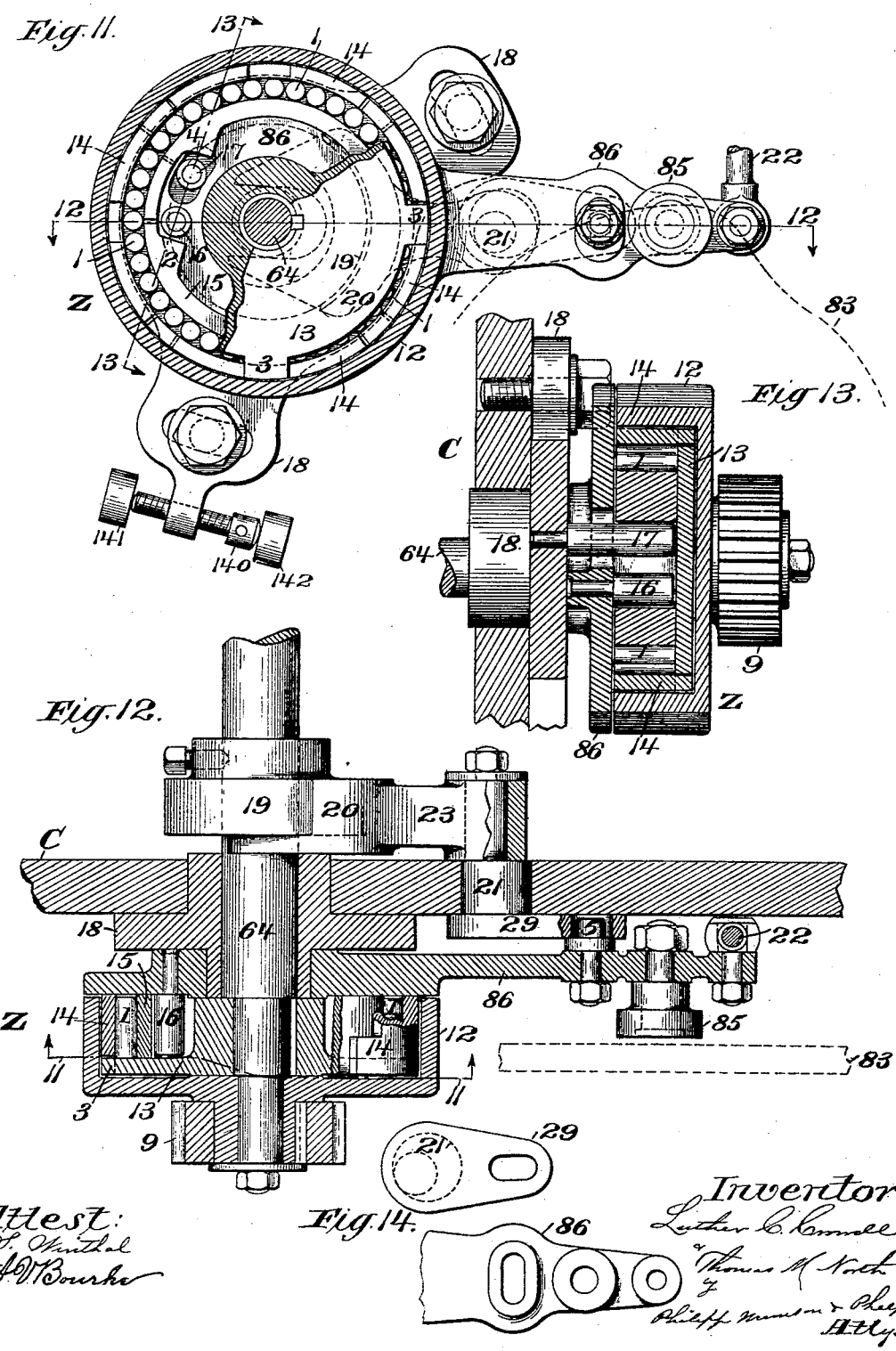

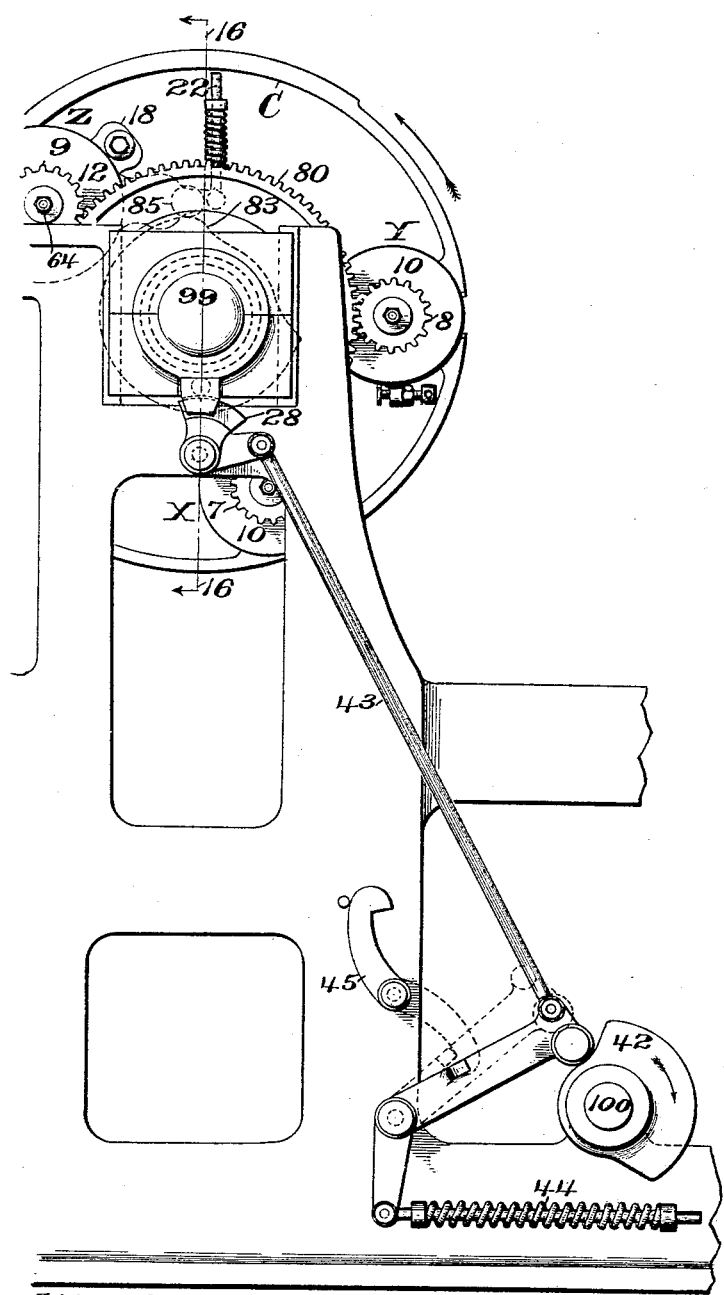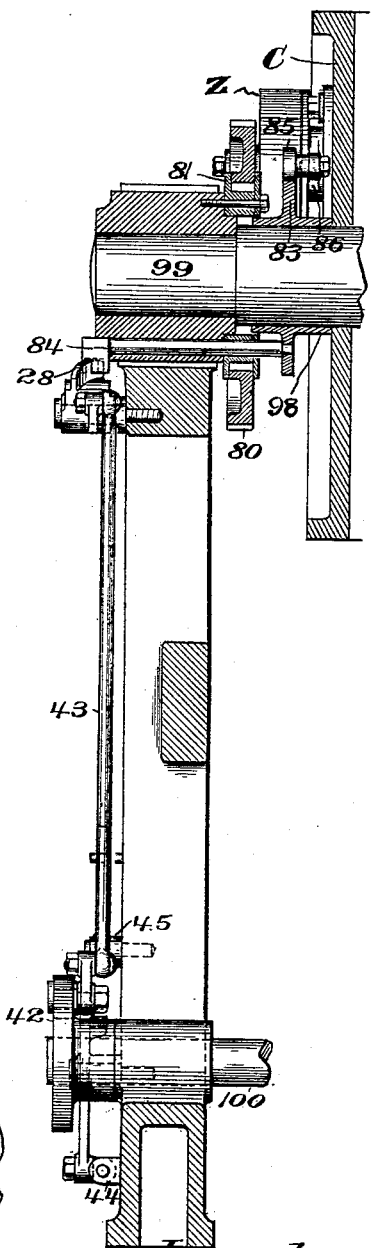

No. 618,059. Patented Jan. 24, 1899.
L. C. CROWELL & T. M. NORTH.
TYMPAN SHIFTING MECHANISM.
(Application filed Mar. 16, 1897.)
(No Model.) 9 Sheets—Sheet 9.
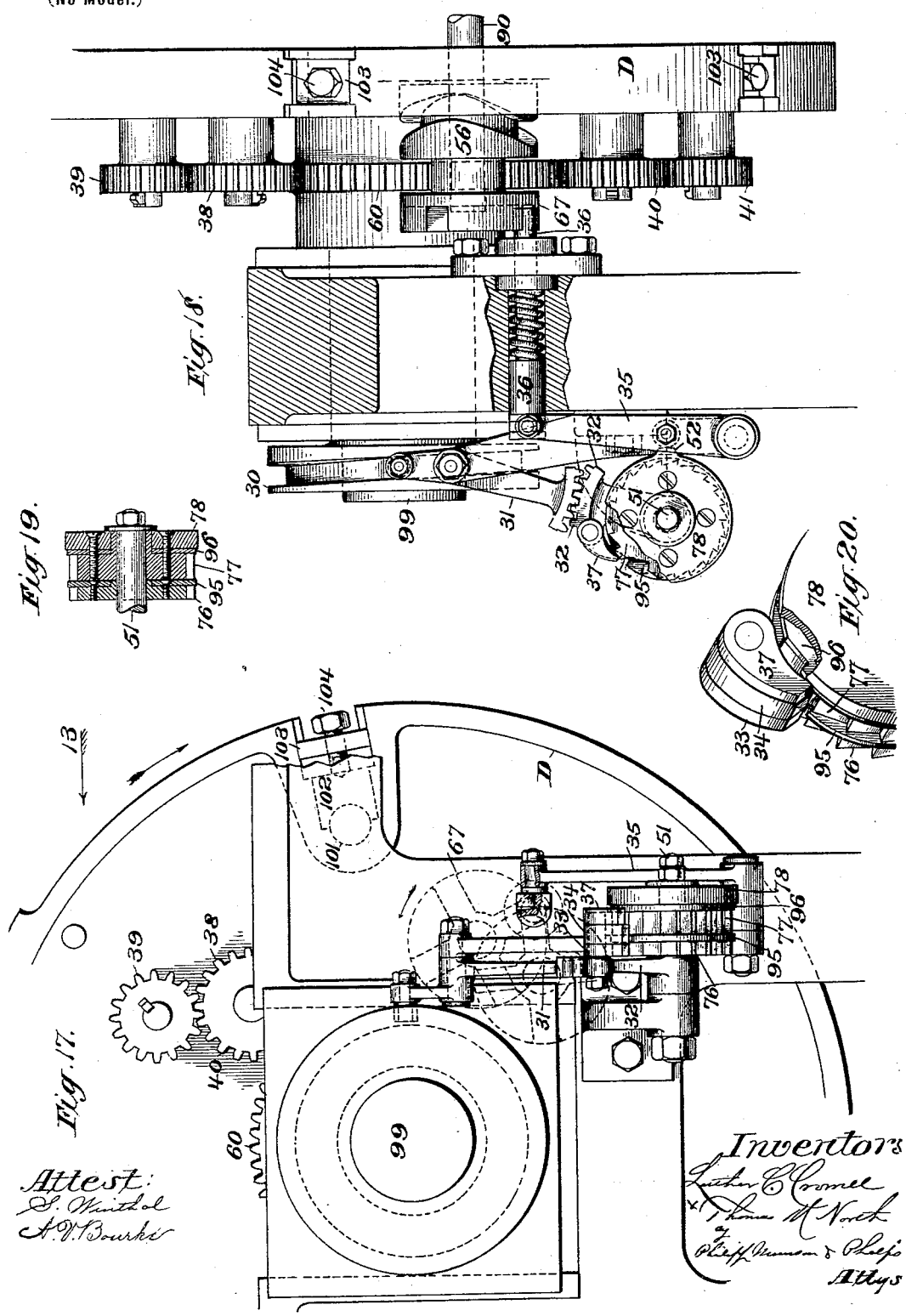

UNITED STATES PATENT OFFICE.

LUTHER C. CROWELL AND THOMAS M. NORTH, OF NEW YORK, N. Y., ASSIGNORS TO ROBERT HOE, THEODORE H. MEAD, AND CHARLES W. CARPENTER, OF SAME PLACE.

TYMPAN-SHIFTING MECHANISM.

SPECIFICATION forming part of Letters Patent No. 618,059, dated January 24, 1899.

Application filed March 16, 1897. Serial No. 627,778. (No model.)

*To all whom it may concern:*

Be it known that we, LUTHER C. CROWELL, a citizen of the United States, and THOMAS M. NORTH, a subject of the Queen of Great Britain, both residing in the city of New York, (Brooklyn,) county of Kings, State of New York, have invented certain new and useful Improvements in Tympan-Shifting Mechanisms, fully described and represented in the following specification and the accompanying drawings, forming a part of the same.

This invention relates to that class of mechanisms by which a tympan in the form of a long web stretched from one roller to another within the impression-cylinder of a printing-machine and passed intermediately over the impression or printing surface of said cylinder is moved over that surface, so as to present a clean surface for a once-printed sheet during its perfecting or second printing, the especial objects of the invention being to provide an improved mechanism of this class and more particularly of that class of tympan mechanisms wherein the moving or shifting operation upon said tympan is such as to move it a distance at least equal to the length of the printing-form, and to further provide means whereby a long tympan having been repeatedly shifted in one direction may by an automatic reversal of its actuating mechanism be repeatedly shifted in a contrary direction, which repeated operations will not only constantly re-present a fresh surface of the tympan, but will enable a long tympan to be reused until it is worn out.

The invention embraces improvements upon those embodied in L. C. Crowell's applications, Serial No. 540,826, filed March 7, 1895; Serial No. 541,275, filed March 11, 1895, and Serial No. 565,905, filed October 16, 1895; and it consists in the improved structures hereinafter fully described and particularly claimed.

In the accompanying drawings, Figure 1 represents an end elevation of an impression-cylinder of a printing-machine provided with a tympan-shifting mechanism embracing the present invention, the view being taken on the section-line 1 of Fig. 4 just within the frame of the machine, as seen looking in the direction of the arrow 1 in that figure. Fig. 2 represents an elevation of the opposite end of said cylinder, the view being taken on the section-line 2 of Fig. 4 just within the frame of the machine. Fig. 3 represents a vertical sectional elevation of said cylinder and its mechanisms, the view being taken on the section-line 3 of Fig. 4. Fig. 4 represents a side elevation of said cylinder (shaft omitted) as seen when in the position of its rotation shown in Figs. 1 and 2 and looking in the direction of the arrows 4 in said figures, the friction-clutch applied to one of the paper-rolls being drawn in section to expose its inside construction. Fig. 5 represents a sectional plan view of said cylinder, said view being taken on the irregular section-line 5 of Fig. 1. Fig. 6 represents a horizontal sectional plan view of one of the clutch mechanisms. Fig. 7 represents an enlarged vertical sectional elevation of one of the friction-clutches which operate in connection with the tympan-carrying rollers, the view being taken on the line 7 of Fig. 9, as seen looking in the direction of its attached arrow. Fig. 8 represents the same by a similar view, but showing the operative parts in different positions. Fig. 9 represents a partial side elevation and partial vertical section of the same as seen looking in the direction of the arrow 9 in Fig. 8. Fig. 10 represents the bearing-hub in position in the head of the cylinder and shows a part of the clutch in section, the view being central on the line 10 of Fig. 8. Fig. 11 represents an enlarged vertical sectional elevation of the friction driving-clutch for moving or shifting the tympan, the view being taken on the section-line 11 of Fig. 12. Fig. 12 represents an enlarged horizontal section of the same, taken on the line 12 of Fig. 11. Fig. 13 represents an enlarged vertical sectional elevation of the same, taken on the line 13 of Fig. 11. Fig. 14 illustrates detached parts by side elevations. Fig. 15 represents on a diminished scale so much of a side elevation of a printing-machine as is necessary to illustrate one end of the impression-cylinder and the attachments for setting the tympan moving or shifting mechanisms at each second revolution of said cylinder. Fig. 16 represents upon the same scale a sectional elevation of the parts shown in Fig. 15, the view being taken on the section-line 16 of said figure, some of the attachments being wholly in elevation. Fig. 17 represents an end elevation of the machine, same scale as Fig. 1, of so much of the machine as is necessary to illustrate a reversing apparatus whereby the tympan moving or shifting mechanism is made to operate in both directions. Fig. 18 represents on the same scale a side elevation of one end of said impression-cylinder and reversing apparatus. Fig. 19 is a vertical sectional elevation of the ratchet-wheel of the reversing mechanism. Fig. 20 represents by an enlarged perspective view the pawl-and-ratchet feed of the reversing apparatus.

In some of the figures parts are omitted in aid of perspicuity, and where section-lines appear their attached arrows point in the direction in which the view is seen.

It may first be stated that while this invention is applicable generally to impression-cylinders it is most usefully employed in connection with the second impression-cylinder of a perfecting printing-machine. These improvements are therefore herein shown as applied in connection with such an impression-cylinder, which for convenience of the support and carriage of the devices and mechanisms consists of two heads C D and an intermediate shell or curved bearing-plate which affords an impression-surface E over which the tympan T is stretched and moves and a recess or opening into which the ends of the tympan enter to be wound and rewound and through which the tympan-carrying and tympan-feeding rollers may be reached. This cylinder is mounted fast upon its shaft 99, which turns in bearings supported in the framework, as is usual, and will have operating in connection with it a first impression-cylinder and suitable coöperating mechanisms whereby the printing operations are effected and which may be of various structures, said impression-cylinders and coöperating mechanisms being provided with means for appropriately driving them. The various mechanisms associated with this second impression-cylinder whereby the tympan is operated will first be separately described in order that the operation of the whole may be readily understood when it is hereinafter set forth. This impression-cylinder is provided with tympan-carrying rollers A B, about which the tympan T is wound, it being rewound from one to the other during its shifting operation in both directions, as will hereinafter appear, each of said rollers thus acting at times as a winding-up or receiving roller and as a paying-out or delivering roller, which functions are reversed when the movement of the tympan is reversed. As illustrated herein, the tympan-roller A is acting as the paying-out or delivering roller and the tympan-roller B is acting as the winding-up or receiving roller, the tympan thus moving in the direction of its associated arrows. The rolled-up tympan upon these tympan-carrying rollers, as indicated by dotted lines in Fig. 1, is marked with the designating-letters A B in that figure, so as to readily distinguish their positions therein. This cylinder is also provided with two sets of measuring or feeding rollers 24 25 and 26 27, whose shafts are marked with the roller-numbers in Fig. 2, so that their relation to other parts in that figure may be readily understood. These pairs of rollers are situated near the tympan-carrying rollers A B, respectively, and when in operation to move or shift the tympan both act to move it in the same direction.

The tympan-carrying rollers A B have their shafts journaled in bearings in the cylinder-heads C D, so that said rollers may rotate therein while making the rotative circuit of said cylinder.

The shafts of the tympan-carrying rollers A and B each have one end turning in a bearing composed of a curved seat 101, and a bearing-block 102, a retaining-block 103, and a holding-screw 104, and at their other ends (see Figs. 5 and 10) each of these shafts projects through a journal-box 57, that is supported in the cylinder-head C by means of a curved seat, a bearing-block 105, a retaining-block 106, and a holding-screw 107, (see Fig. 5,) by means of which holding devices said rollers, their shafts, and associated parts may be bodily removed. The shaft 53 of the tympan-carrying roller A is provided on its outer end with a pinion 7, loose thereon, which meshes with a stationary circular rack or wheel 80, (see Fig. 4,) and the shaft 58 of tympan-carrying roller B carries loose on its outer end a pinion 8, which also meshes with said wheel 80, (see Fig. 5,) which pinions are fast to the loose members of the clutches.

The journal-bearings 57 of the tympan-carrying rollers A and B are enlarged (see Figs. 5 and 10) where they protrude beyond the cylinder-head C to form hubs, that in part support the friction-clutches with which the tympan-roller shafts are provided. The shaft 53 of the tympan-roller A has a friction-clutch X, mounted upon its shaft between its pinion 7 and the cylinder-head C, and the tympan-carrying roller B has a friction-clutch Y, mounted upon its shaft 58 between its pinion 8 and the cylinder-head C, and each shaft is provided near its opposite end with a brake-pulley, as 69 70, (see Figs. 3, 4, and 5,) which are operated upon by brake-shoes 71 72, that are pivoted to the arms of a double lever 91, fulcrumed to the cylinder-head D. Between the arms of this lever 91 there is a double-armed spring 93, fast to a small bell-crank 94, pivoted to the cylinder-head D, the ends of which spring may bear upon adjusting-screws carried at the end of each lever 91 and which spring is rocked by means of a cam 92, fast upon the shaft 90. The high parts of this cam 92 act alternately upon the ends of the bell-crank 94 to cause the application of the brake-shoes 71 72, the movement being such as to apply the brake to the shaft of the tympan-roller that is acting as the paying-out roller for the purpose of applying suitable tension thereto or prevent its overrunning, the spring 93 causing the brake-shoe to be applied with an elastic pressure.

The wheel 80, which normally acts as a stationary circular rack, is mounted so as to be rotative at times upon a stationary hub 81, which is secured to the inner face of one of the stationary journal-boxes of the cylinder by means of bolts 79. (See Figs. 1 and 5.) It is prevented from moving in the direction in which the cylinder turns when rotating during the printing operation by means of its spring-seated pawls 82, that engage ratchet-teeth 6 in the peripheral face of said hub 81, but may move in the opposite direction if the cylinder is turned backward.

When the cylinder revolves during the printing operation, its direction of movement is that of its associated arrow, and the wheel 80 will be maintained stationary, while the pinions 7, 8, and 9, whose applied movements are yet to be referred to, will be caused to rotate in the direction indicated by their arrows; but if the cylinder is reversed, as is necessary at times in making ready for printing, this wheel 80, being free to move in that direction, will thus move upon its hub 81 concertedly with said pinions, which are carried with the cylinder, without imparting rotative movement to them for the reason that these pinions bear frictionally thereon sufficiently to carry this wheel 80 with them in their movement when making a backward circuit with the cylinder, and thus not rotate themselves at this time, which movement of them would move the tympan out of place.

The measuring or feeding rollers 24 25 and 26 27 have their shafts mounted in journals in the cylinder-heads C D, and their shafts project beyond the cylinder-head D, outside of which they are respectively geared together to revolve in unison by means of pinions 38 39 and 40 41, the pinions 38 and 40 meshing with a wheel 60, whose hub 59 embraces the shaft 99 of the cylinder and upon which shaft said wheel 60 may freely revolve in both directions. This wheel 60 acts as part of a train of gearing actuating the feeding or measuring rollers, and it is driven through an intermediate 61, that gears with pinions 62 and 63, by one or the other of which it is driven, when it moves according to which one of said pinions is then active as the driver. The wheel 62 runs free upon a stud 68, fast to the cylinder-head D, and pinion 63 is loose upon a shaft 64. The stud 68 also carries a wheel 65, loose upon it, and the shaft 64 a wheel 66, fast upon it, said wheels 65 66 being of the same size and maintained in gear. Upon each of the hubs of the wheels 65 and 66 is a clutch member, as 47 48, that slides on a spline and coacts with a fast clutch member, as 49 50, fast to the wheels 62 63, respectively. The details of construction of one of these clutches is shown in Fig. 6, while Fig. 5 shows the relation of both to the parts with which they are associated. The sliding movement of the movable clutch members 47 48 is effected by an oscillating shaft 73, journaled in the cylinder-head D and having a rock-arm 74, that extends into a slotted cam 56, on the cam-shaft 90. Said shaft 73 carries fast at its outer end a two-armed lever 75, toes from the ends of which lever-arms, respectively, enter a peripheral slot in the loose members 47 48 of the clutch mechanisms, and thus alternately throw one of the clutches into couple and simultaneously cause the uncoupling of the other parts. This clutching operation is performed after long intervals and is controlled by means of a tumbler-cam 67 on the outer extremity of the shaft 90, which shaft makes a quarter-turn each time it is operated upon and carries all the cams that operate upon the levers, whose functions are to change the direction of the movement of the tympan, and the cams are of such shape that upon each such quarter-turning of the shaft 90 the change is made. This tumbler-cam 67 (best seen in Fig. 18) is actuated through means of a tumbler-pin 36, which is projected through the side frame to enter one of its four recesses and be withdrawn therefrom in manner as will hereinafter more fully appear.

The shaft 64 is journaled in the cylinder-heads and projects at that end opposite to its end carrying the wheel 63 far enough to support a pinion 9, that meshes with and is driven by the wheel 80 in like manner as are the pinions 7 8. Said shaft 64 has a friction-clutch Z interposed between its pinion 9 and the cylinder-head C. This pinion 9, as well as the pinions 7 and 8, will for the reason that their carrying-shafts make the rotative circuit of the cylinder, thus be caused to roll in the teeth of the then stationary circular rack or wheel 80, and hence be uniformly driven rotatively thereby, and they respectively are fast to and hence drive the loose members of the clutches X Y Z.

The friction-clutch X causes the movement of the tympan-roller A, the friction-clutch Y causes the movement of the tympan-roller B, and the friction-clutch Z causes the movement of the measuring-rollers 24 25 and 26 27. The clutches X Y are controlled in their action by a reversing-cam 88, with which the clutch-levers 87 87 coact, said cam 88 being fast upon the shaft 90, and the clutch Z is controlled in its action by a cam 83, which is provided with a hub 98, embracing the shaft 99, said cam 83 being capable of a lateral or sliding movement upon the shaft, as seen in Fig. 16, and being prevented from rotating by a pin 84, which is bolted to it and sliding in the cylinder journal-box and through the ratchet-hub 81 of the wheel 80.

The friction-clutches X Y Z are in general construction and mode of operation alike, and for this reason corresponding parts in each are designated by the same letters of reference in order that the description of one may in part be read upon the other.

The structure and action of the clutches X and Y will be understood from the following detailed description of one of them in connection with Figs. 7, 8, 9, and 10. As appears in Fig. 9, the shaft 53 of the tympan-roller A turns in a journal or bearing hub 57, supported by the cylinder-head C, which journal or bearing 57 (see Fig. 10) has its outer end formed as a hub to aid in supporting the movable parts constituting the internal member of the clutch. The internal or fast member of the clutch consists of a circular plate 13, provided with four radially-projecting tongues 3, each of which enters into a slot in one of the segments constituting a ring 14, which rests just within the shell or outer member 10, which ring 14 is made segmental in order that it may expand and be pressed outward forcibly against the inner periphery of the shell of the outer loose or driving member 10. This internal or fast member 13 is provided with a central circular hub, which is of a size to enter within the journal-bearing 57 and embrace the shaft 53, to which it is made fast by a key. (See Figs. 7, 8, and 9.) Arranged at a distance within and concentrically with this segmental ring 14 is a split ring 15, and the space between the segmental ring 14 and the split ring 15 is filled with antifriction-rollers 1. This split ring 15 has two lugs 2 4 projecting inwardly from it, one at each side of its split portions, which coöperate with rolls 16 17, as will appear. The roll 17 is pivoted to the stationary journal-box 57, (see Figs. 7, 8, and 10,) so as to be alined circumferentially with the lug 4 of the split ring 15, and the roll 16 is pivoted to the enlarged journal-plate of the lever 87 and projects therefrom (see Fig. 9) within the body of this clutch, so as to protrude into circumferential alinement with the lug 2, the hub of the journal-box 57 being cut away (see Figs. 7 and 8) to permit of the circumferential movement of the roll 16, carried by the lever 87. The outer shell or loose member 10 has keyed to it the pinion 7 and turns freely on the shaft 53. It is cup-shaped to provide it with an inwardly-projecting flange that overlies the ring 14, and thus envelops the internal members of the clutch. The enlarged journal of the operating-lever 87 of the clutch swings upon a stepped portion of the journal-box 57 (see Fig. 10) and carries at its outer end an antifriction-bowl which is borne upon by the cam 88. This lever 87 is moved to carry the movable devices of the fast member of the clutch into clutching action with respect to the loose member by means of a spring 46, the heel of which is fixed by bolts securing it to the cylinder-head C and the free end of which bears upon an adjustable screw that protrudes from a lug 111, which projects at one side of said lever 87, and the contrary movement of these parts is compelled by the cam 88. It will now be understood that when the high part of the cam 88 bears against the lever-arm 87, and thus holds said lever against the pressure of the spring 46, as in the position shown in Fig. 7, the roll 16, carried by said lever, will be swung out of contact with the lug 2 on the split ring 15, thus enabling said ring to collapse sufficiently to remove the pressure it exerted upon the segmental ring 14 through the non-friction rollers 1, and thus allow inward movement of the segments of the ring 14 to such an extent as to relieve them from exerting any friction upon the loose member 10 of the clutch, whereupon said loose member will run free without affecting the shaft 53. In other words, the clutch will be inactive. When, however, the cam 88 is turned so as to present its low part to the lever-arm 87, as in Fig. 8, the spring 46 will by its pressure swing the said lever and the parts it carries into the position shown in Figs. 8 and 9. This swinging movement of the lever 87 will press the roll 16 it carries against the lug 2 of the split ring 15, and thus coacting with the fixed roll 17, carried by the stationary journal-box 57 and held against the lug 4 of said split ring, cause the same to be spread and enlarged in its circular extent, so as to press, through the antifriction-rolls 1, the segments 14 outwardly into contact with the inner surface of the circular rim 10 of the loose member of the clutch and to exert such a frictional pressure thereon as to cause the fast members of the clutch to turn with the said loose member, whence it follows that the motion of the latter applied to it from the wheel 80 through the pinion 7 will be imparted to the shaft by a frictional connection, the power of which is determined by the pressure of the spring 46, which latter may be adjusted by the adjusting-screw 150.

The friction-clutch Z is best illustrated in Figs. 11, 12, 13, and 14. Its outer shell or loose member 12 has keyed to it the pinion 9 and with it turns freely on the shaft 64. The internal or fast member 13 is keyed to said shaft 64 and is provided with four radially-projecting tongues 3, which each enter into segments of a ring 14, that rests just within the shell or outer member 12. This ring 14 is made segmental in order that it may expand and be pressed forcibly against the inner periphery of the loose member 12. Arranged concentrically within this segmental ring 14 is a split ring 15, and the space between the segments 14 and this split ring 15 is filled with antifriction-rolls 1. This split ring 15 has two lugs 2 4 projecting inwardly from it, one at each side of its split portions, in connection with which two rolls 16 17 coöperate. The roll 16 is pivoted to the enlarged journal-plate of the lever 86 and projects therefrom and within the body of this clutch, so that it bears behind the split ring 15, (see Fig. 12,) and the roll 17 is pivoted to the journal-bearing 18 of this shaft 64 and projects therefrom through a recess in the journal-plate of the lever 86 and extends behind the split ring 15. (See Fig. 13.) These rolls 16 17 are so related thereto that they will be contacted with by the lugs 2 4 whenever the lever 86 of this clutch is properly moved. When so moved, the roller 17 will hold the ring 15 in one direction and the roller 16 will move it in the other, thus expanding it circumferentially and through the antifriction-rollers 1 forcing the segmental ring 14 outwardly into such frictional contact with the loose member 12 as to cause the same to be clutched to the shaft 64, and thus enable the driven pinion 9 to impart motion to the shaft 64. The journal-bearing 18, which is bolted fast to the cylinder-head C through lugs, as shown in Figs. 1 and 11, has said lugs provided with slots, whereby its fastening-bolts may be loosened, and the position of said journal-bearing may be rotatively adjusted, so that the extent of expanding movement applied to the split ring 15 by the lever 86, aided by the roll 17, may be regulated and the pressure exerted by said ring when it is expanded circumferentially be adjusted to a nicety, which position of adjustment is fixed by means of an adjusting-screw 140 and lugs 141 142, fast to the cylinder-head. The clutch is put into action by lifting the lever 86, which is hung to vibrate upon the journal-bearing 18 of the shaft 64 and held depressed by a spring-seated rod 22, that constantly forces this lever inwardly. This lever is raised to apply the clutch by means of the cam 83, which is moved inwardly or into the position of Fig. 16 to engage the roll 85 while the low part of said cam is passing this roll. When this roll rides over the high part of the cam, it presses the lever 86 outwardly and by expanding the split ring 15 causes the segments 14 to press against the loose member 12, and thus to so frictionally connect the fast and loose members of said clutch that the shaft 64 will be rotated and cause the feed-rollers 24 25 and 26 27 to be driven at a uniform speed during the whole of the time that said roll is running over the high part of this cam. A brake-wheel 19 is fast to this shaft 64 just within the cylinder-head C and has acting upon it a brake-shoe 20, from which extends an arm 23, hung on an eccentric-pin 21, journaled in the cylinder-head C and rocked to move the brake-shoe to and from the brake-wheel 19 by a rock-arm 29, which latter has at its outer end (see Fig. 14) a laterally-enlarged bearing for the play of the end of a driving-stud 5, that projects from the lever 86. This stud 5 is adjustable in a vertical slot provided in the lever 86, so that the degree of pressure exerted upon the brake may be nicely regulated. This rotative movement of the said rollers 24, 25, 26, and 27, determined by the cam 83, causes the tympan to be moved or shifted over the impression-surface of the cylinder and to be transferred from one tympan-roller, as A, to the other tympan-roller, as B, at each second revolution of the cylinder, and it controls or measures the length of tympan which is fed, and thus shifted from one to the other. It will be understood that in this tympan moving or shifting operation the clutch Y, which is in active operation, as shown, simultaneously drives the shaft 58 and causes the tympan-roller B to wind up the tympan as long as the roll of its lever 87 is opposite to the low part of the reversing-cam 88, in which position of the parts the spring 46 forces the lever 87 to expand the split ring 15, so that it forces the segment-ring 14 to frictionally clutch its outer or loose member 10; also, that during this movement of the tympan the friction-clutch X is inactive and so remains as long as the roll of its lever 87 is pressed upon by the high part of the cam 88, in which position it allows the split ring 15 of this clutch to contract, and thus enables the segment-rings 14 to be relieved of frictional pressure upon the loose member of the clutch.

The mechanism for causing the shifting operation of the tympan to be performed at each second revolution of the cylinder, or, in other words, the mechanism for controlling the active and inactive positions of the cam 83, is shown in Figs. 15 and 16. This cam is moved into active position at the appropriate time by means of an oscillating incline-faced lever 28, which is pivoted to the side frame in such position as to play in the slotted head of the stud 84. The rocking motion of this lever 28 is caused by a cam 42 on a cam-shaft 100 at the lower part of the machine, which shaft makes one revolution to two of the impression-cylinder and moves the lever 28 by means of a connecting-rod 43, which is attached at its upper end to a rock-arm on the shaft of the lever 28 and at its lower end carries a stud which bears upon the face of the cam 42, where it is held to duty by means of a spring-rod 44 and an intermediate bell-crank attached to said rod 43. A hook 45 is provided to hold the cam-lever up and prevent movement of the rock-lever 28 when that effect is desired.

The mechanism for causing the reversal of the direction of the run of the tympan at the end of a desired or predetermined number of revolutions is illustrated in Figs. 17 to 20. The cylinder-shaft 99 carries near its outer end a cam 30, which acts upon a segment-lever 31 and causes it to vibrate once during every revolution of the cylinder. Said lever 31 is geared with a similar lever 32, which is pivoted on the shaft 51 of a multiplex ratchet-wheel composed of two ratchet-wheels 76 77 and a cam-disk 78, and this lever 32 carries pivoted to a stud projecting from it three pawls 33 34 37. The ratchet-wheel 76 in this instance is provided with twenty teeth, and it has attached to it at one side, next to the ratchet-wheel 77, a guard-disk 95, having one tooth. The ratchet-wheel 77 in this instance has twenty teeth, and between it and the cam-disk 78 there is a guard-disk 96, which has one tooth. This ratchet-wheel 77, guard-disk 96, and the cam-disk 78 are attached together as a single member. At each revolution of the cylinder the pawl 33 moves the ratchet-wheel 76 the distance of one tooth, during which revolution the pawl 34 rides idly on the plane periphery of the guard-disk 95 and the pawl 37 rides idly upon the plane periphery of the guard-disk 96. Twenty onward movements of the ratchet-wheel 76 are thus made to cause it to revolve once; but as its revolution is completed at its twentieth movement the pawl 34 simultaneously drops into the single tooth of the guard-disk 95 and into one of the teeth of the ratchet-wheel 77, so that at the making of its twentieth impulse or completion of a revolution of the ratchet-wheel 76 the ratchet-wheel 77 is moved one tooth. As the pawls again move the pawl 33 will alone be active, the pawls 34 37 again riding idly upon the plane peripheries of the guard-disks 95 and 96. When twenty movements of the ratchet-wheel 76 are again made, the pawl 34 will again move the ratchet-wheel 77 one tooth. When this action has been performed nineteen times, the pawl 34 by moving the ratchet-wheel 77 forward one tooth will move the projection 52 on the cam-disk 78, which is attached to the ratchet-wheel 77, into position to operate the lever 35, which is attached to the spring-seated stud 36, and press the latter inwardly, so that it will engage a tooth of the tumbler-cam 67, which thus engaged will cause the shaft 90 to make one-quarter revolution. On the return stroke of the pawls after the nineteenth complete revolution of the ratchet-wheel 76 and when the projection of the cam-disk is in operating position the pawl 37 will drop into the tooth of the disk 96, and at its next forward movement it will move the projection on the cam-disk, to which it is attached, out of operation, and thus prevent the reversing action of the stud 36. It will also move the ratchet-wheel 77 onward its twentieth tooth. Thus it will be seen that the projection will be in position every three hundred and eightieth revolution of the cylinder (twenty times nineteen) and remain in position only through one revolution. It being understood that this second or tympan cylinder makes turn for turn with the first impression-cylinder and receives the once-printed sheet at its alternate revolutions, at which time it carries the sheet through its second or perfecting impression and thus has the freshly-printed first side of the sheet bearing upon the tympan, and that during a predetermined number—say three hundred and eighty—of revolutions of this tympan-cylinder the tympan is to be shifted onward a form's length at a time, during which the reversing-shaft 90, which, though moved rotatively with the cylinder, maintains the fixed position of its own rotation therein, (shown particularly in Figs. 1, 2, 3, and 4,) in which position it is held by the spring-lever 54 fast to the shaft 99 and taking into one of four notches in the pulley 55, carried by the shaft 90, (see Figs. 2, 4, and 5,) which shaft 90 thus maintained fixedly holds the clutch X out of action, allows the clutch Y to be in action or clutched to the shaft 58, maintains the cam 56 stationary, and thus holds the wheels 65 and 62 clutched together, so that the train of wheels 66 65 62 61 may act to drive the wheel 60 and through it the wheels 38 39 and 40 41, and also that the tympan T is then when shifted through this train moved in the direction of its arrow, being unwound from the roller A and wound up upon the roller B, and, further, that the friction-clutch Y, which couples the pinion 8 to the shaft of roller B, is then in action, so that that pinion may drive it, and that the friction-clutch X, associated with roller A, is then out of action, the following description of the operation will be clear: As soon as the sheet a second time printed by the coaction of this tympan-cylinder has in its movement for delivery passed off from the impression-surface of this cylinder, which it will be observed occupies about one-half of the circumferential extent of its periphery, and the tympan-cylinder is beginning its revolution, during the making of which the first impression-cylinder is by its alternate revolution printing the first side of the sheet, the tripping mechanism, Figs. 15 and 16, which moves the stud 84 will project the same inwardly, thus carrying with it the cam 83, which will thus be brought into a vertical pathway, which will cause it to bear upon the roll 85 of the lever 86, as seen in Fig. 15. When this roll 85 mounts the high part of the cam 83, it will move the lever 86 outward against the resistance of its spring-rod 22, as in Fig. 1, and thus set the friction-clutch Z into action, whereupon the motion of the pinion 9, turning on the wheel 80, will be applied to the shaft 64, which, through the wheel 66, rotates the wheel 65, which latter, then clutched to the wheel 62, will drive the wheel 60 through the intermediate 61, and thus rotate the wheel 60, which in turn will revolve the wheels 38 39 and 40 41 on the shafts, respectively, of the feeding-rolls 24 25 and 26 27, thus causing these rollers, together with the action of the winding-up clutch Y, to move or feed the tympan T, the pair of rollers 24 25 to draw off or unwind the tympan from the roller A against the resistance afforded by the brake-shoe 71 then applied to it, and causing the pair of rollers 26 27 to move uniformly onward to move or feed it to the wind-up roller B, which latter winds it up by rotation imparted to it by the pinion 8 through the clutch Y, these operations causing the tympan stretched over the impression-surface of the cylinder to be moved or shifted over the same to an extent equal circumferentially to the bearing which the form has thereon. The length of the high part of the cam 83 corresponds with this circumferential extent, and when the roller 85 passes off the high part of this cam, after which the cam is withdrawn by the oscillating lever 28, the lever 86 is moved inwardly by its spring-rod 22, which movement of the lever 86 opens the clutch Z and simultaneously applies the brake-shoe 20 to suspend rotary movement of the shaft 64 and (see Fig. 2) the movement of the wheels 62, 61, and 60, 38, 39, 40, and 41, and consequently suspends the feeding action of the tympan-rollers 24 25 and 26 27. The tympan T is thus at every second or alternate revolution of this second impression-cylinder shifted over its surface to a distance equal to the space occupied by the impression of the form, whereby is presented an entirely clean tympan-surface for the offset during the second printing, and this operation is repeated, say, three hundred and eighty times, at the end of which the tympan-web will have been unwound from the roller A and will have been rewound upon the roller B, whereupon in order to shift this tympan in a like manner in the opposite direction, and thus transfer the tympan-web from the roller B to and wind it up upon the roller A, the reversing mechanism, Figs. 17 to 20, comes into action to impart a quarter-turn to the shaft 90 by moving the tappet-pin 36 into engagement with the tumbler-wheel 67 through the action of the cam projection 52 on the shaft 51, the result being that this tumbler-wheel 67 will be moved a quarter-turn in the direction of its arrow in Fig. 2 and secured by the spring-lever 54 falling into the notched periphery of the pulley 55. This tumbler-wheel 67 is shown in dotted lines in Fig. 2 to illustrate this operation. This movement of the shaft 90 will swing the reversing-cam 88 in the direction of its associated arrow in Fig. 1 and cause its enlarged part to move the clutch-lever 87 on clutch Y into a position corresponding to the position the clutch-lever 87 has with respect to the clutch X and allow the clutch-lever 87 of the clutch X to overlie the low part of the cam 88 in like position as the clutch-lever 87 is shown with respect to the clutch Y in full lines in Fig. 1. This action couples or sets into operation the clutch X to cause the tympan-roller A to act as a wind-up roll and releases the clutch mechanism Y, so that the tympan may pass off from the roller B, and the cam 92 simultaneously, through the bell-crank 94, applies the brake-shoe 72 to the brake-pulley 70 on the shaft of roller B, so as to maintain an even tension upon the tympan T in its movement therefrom and relieves the brake-pulley 69 on the shaft of roller A from the pressure of the brake-shoe 71 thereon, thus leaving said wind-up roller A wholly within the control of its clutch X. This rotary movement of the shaft 90 also simultaneously causes a quarter-turn of the cam 56, which, through the rock-arm 74, oscillating shaft 73, and two-armed lever 75, (see Figs. 4 and 5,) slides the moving members 47 48 of their respective clutches in a direction that causes the wheel 62 to be unclutched from the wheel 65 and the wheel 63 to be clutched to the wheel 66, so that when motion is imparted to the shaft 64 the wheel 66, fast upon the shaft, will, though moving the wheel 65 idly, actively rotate the wheel 63 and through it wheel 61 in a direction opposite to that which it formerly had, and thus impart such opposite movement of rotation through the wheel 60 to the wheels 38 39 and 40 41, whereupon such movement will shift or carry the tympan T in a direction opposite to that in which it is illustrated as moving generally in the drawings, the result being, since the tappet-pin 36 is quickly withdrawn, that the shaft 90 and the parts it controls will stand in the last-described positions during the next three hundred and eighty revolutions of this cylinder, during which said tympan T is progressively shifted a form's length at a time over the impression-surface of this second impression-cylinder, whereupon the tappet-pin 36 is again operated to repeat the reversing operation and cause the tympan when moved to move in the direction first described. Only one of the rollers of the pairs 24 25 and 26 27 needs to be driven positively, as its companion may be driven from the other and yet move the tympan. Although advantageous to have the driving-wheel of the companion rollers 24 25 and 26 27 constantly geared to wheel 60, so that both will be positively driven when either is moved, it will be apparent that only one set need be driven when the tympan is moved, the other set being disengaged, as by throwing out one of its gears, so that it will be moved by the tympan only, one or the other set being thus disconnected, according to the direction in which the tympan is moving.

What is clamed is—

1. The combination with an impression-cylinder, two tympan-carrying rollers mounted to revolve therein, and two sets of feeding-rolls between which the tympan is intermediately stretched over the impression-surface of said cylinder, of means for simultaneously driving said feeding-rolls to shift the tympan by drawing it from one carrying-roller and feeding it to the other, and means for reversing the direction of motion of the feeding-rolls, substantially as described.

2. The combination with an impression-cylinder, of two tympan-carrying rollers mounted to revolve therein, between which the tympan is intermediately stretched over the impression-surface of said cylinder, an interposed set of feeding-rolls, mechanism for driving said feeding-rolls to shift the tympan by drawing it from the delivery carrying-roller and feeding it to the receiving carrying-roller, and mechanism for driving the receiving carrying-roller and maintaining a constant driving tension thereon, substantially as described.

3. The combination with an impression-cylinder, of two tympan-carrying rollers mounted to revolve therein, between which the tympan is intermediately stretched over the impression-surface of said cylinder, an interposed set of feeding-rolls, mechanism for driving said feeding-rolls to shift the tympan by drawing it from the delivery carrying-roller and feeding it to the receiving carrying-roller, mechanism for driving the receiving carrying-roller and maintaining a constant driving tension thereon, and means for applying friction to the delivery carrying-roller, substantially as described.

4. The combination with an impression-cylinder, two tympan-carrying rollers mounted to revolve therein, and two sets of feeding-rolls between which the tympan is intermediately stretched over the impression-surface of said cylinder, of means for simultaneously driving said feeding-rolls to shift the tympan by drawing it from one carrying-roller and feeding it to the other, means for applying friction to the delivering carrying-roller and means for rotating the receiving carrying-roller, substantially as described.

5. The combination with an impression-cylinder, of two tympan-carrying rollers mounted to revolve therein, between which the tympan is intermediately stretched over the impression-surface of said cylinder, an interposed set of feeding-rolls, mechanism for driving said feeding-rolls to shift the tympan by drawing it from the delivery carrying-roller and feeding it to the receiving carrying-roller, mechanism for driving the receiving carrying-roller, and means for applying friction to the delivery carrying-roller, substantially as described.

6. The combination with an impression-cylinder, two tympan-carrying rollers mounted to revolve therein, and two sets of feeding-rolls between which the tympan is intermediately stretched over the impression-surface of said cylinder, of means for simultaneously driving said feeding-rolls to shift the tympan, a positive driving mechanism for the receiving carrying-roller, and a friction-clutch on the shaft of the receiving carrying-roller, substantially as described.

7. The combination with an impression-cylinder, two tympan-carrying rollers mounted to revolve therein, between which the tympan is intermediately stretched over the impression-surface of said cylinder, and an interposed set of feeding-rolls, of means for driving said feeding-rolls to shift the tympan by drawing it from the delivering carrying-roller and feeding it to the receiving carrying-roller, means for applying friction to the delivering carrying-roller, means for driving the receiving carrying-roller, and a friction-clutch interposed between said driving mechanism and the shaft of the receiving carrying-roller, substantially as described.

8. The combination with an impression-cylinder, two tympan-carrying rollers mounted to revolve therein, and two sets of feeding-rolls between which the tympan is intermediately stretched over the impression-surface of said cylinder, of means for simultaneously driving said feeding-rolls to shift the tympan, driving mechanism for each of the tympan-carrying rollers, a friction-clutch between each said driving mechanism and the shaft of the roller with which it is associated, and means for simultaneously connecting one friction-clutch with its shaft and disconnecting the other friction-clutch from its shaft and for reversing the movement of the feeding-rolls, substantially as described.

9. The combination with an impression-cylinder, two tympan-carrying rollers mounted to revolve therein, one delivering the tympan and the other receiving it, and two sets of feeding-rolls between which the tympan is intermediately stretched over the impression-surface of said cylinder, of mechanism for driving said carrying-rollers, a friction-clutch between the driving mechanism for each carrying-roller and its shaft, mechanism for driving said feeding-rolls, a friction-clutch between said last-mentioned driving mechanism and said feeding-rolls, means for putting into action the clutches for the feeding-rolls and the receiving carrying-roller to secure their simultaneous action, and means for putting the clutch of the delivery carrying-roller out of action, substantially as described.

10. The combination with an impression-cylinder, two tympan-carrying rollers mounted to revolve therein, one delivering the tympan and the other receiving it, between which the tympan is intermediately stretched over the impression-surface of said cylinder, and an interposed set of feeding-rolls, of mechanism for driving said carrying-rollers, a friction-clutch between the driving mechanism for each carrying-roller and its shaft, mechanism for driving said feeding-rolls, a friction-clutch between said last-mentioned driving mechanism and said feeding-rolls, means for putting into action the clutches for said feeding-rolls and the receiving carrying-roller to secure their simultaneous action, and means for putting the clutch of the delivery carrying-roller out of action, substantially as described.

11. The combination with an impression-cylinder, and two tympan-carrying rollers mounted to revolve therein and between which the tympan is intermediately stretched over the impression-surface of said cylinder, of a driving mechanism for each of said rollers, a friction-clutch between the driving mechanism and the shaft of each of said rollers, two sets of feeding-rolls which control the shifting movement of the tympan and means for rendering said feeding-rolls and carrying-rollers operative in opposite directions during alternate periods, substantially as described.

12. The combination with an impression-cylinder, and two tympan-carrying rollers mounted to revolve therein and between which the tympan is intermediately stretched over the impression-surface of said cylinder, of a driving mechanism for each of said rollers, a friction-clutch between the driving mechanism and the shaft of each of said rollers, two sets of feeding-rolls which control the shifting movement of the tympan and means for rendering the set of feeding-rolls and carrying-roller which act upon opposite ends of the tympan operative to advance and wind up the tympan in opposite directions during alternate periods, substantially as described.

13. The combination with an impression-cylinder, two tympan-carrying rollers mounted to revolve therein and between which the tympan is intermediately stretched over the impression-surface of said cylinder, and two sets of feeding-rolls which control the shifting movement of the tympan, of a driving mechanism for the carrying-rollers and feeding-rolls, a friction-clutch between each driving mechanism and the shafts actuating said rollers and rolls, and means rendering the receiving carrying-roller and its adjacent feeding-roll operative in opposite directions during alternate periods, substantially as described.

14. The combination with an impression-cylinder, two tympan-carrying rollers mounted to revolve therein and between which the tympan is intermediately stretched over the impression-surface of said cylinder, and two sets of feeding-rolls which control the shifting movement of the tympan, of a driving mechanism for the carrying-rollers and feeding-rolls, a friction-clutch between each driving mechanism and the shafts actuating said rollers and rolls, means rendering the receiving carrying-roller and its adjacent feeding-roll operative in opposite directions during alternate periods, and means disconnecting the driving mechanism from the delivering carrying-roller, substantially as described.

15. The combination with an impression-cylinder, two tympan-carrying rollers mounted to revolve therein and between which the tympan is intermediately stretched over the impression-surface of said cylinder, and two sets of feeding-rolls which control the shifting movement of the tympan, of a driving mechanism for the carrying-rollers and feeding-rolls, a friction-clutch between each driving mechanism and the shafts actuating said rollers and rolls, means rendering the receiving carrying-roller and its adjacent feeding-roll operative in opposite directions during alternate periods, means disconnecting the driving mechanism from the delivering carrying-roll, and, means applying friction to the latter, substantially as described.

16. The combination with an impression-cylinder, two tympan-carrying rollers mounted to revolve therein and between which the tympan is intermediately stretched over the impression-surface of said cylinder, and feeding-rolls which control the shifting movement of the tympan, of a driving mechanism for the carrying-rollers and feeding-rolls, a friction-clutch between each driving mechanism and the shafts actuating said rollers and rolls, and a spring-actuated lever coupling the coacting members of said clutches to the shafts they drive, substantially as described.

17. The combination with an impression-cylinder and feeding-rolls which control the shifting movement of the tympan, a driving-shaft for said rolls, a friction-clutch connected with said shafts the fast member whereof is positively driven and the loose member of which is applied by a lever, of the lever-bearing 18 carrying the pin 17 and means for adjusting the position of said pin to vary the friction of the clutch, substantially as described.

18. The combination with an impression-cylinder, two tympan-carrying rollers mounted to revolve therein, and two sets of feeding-rolls between which the tympan is intermediately stretched over the impression-surface of said cylinder, of the circular rack 80 constructed and mounted so as to be stationary when the tympan-supporting cylinder moves in its printing direction, and to be movable therewith in its non-printing direction, whereby the position of the tympan is maintained at all times, substantially as described.

19. The combination with an impression-cylinder, and tympan-carrying rollers mounted to revolve therein, of a friction-clutch for the actuating-shaft thereof and means for driving said clutch, a spring-actuated lever operating to couple the clutch, and means for adjusting the pressure of said spring, substantially as described.

20. The combination with an impression-cylinder and two tympan-carrying rollers mounted to revolve therein, of friction-clutches for the actuating-shafts thereof, means for driving said clutches, spring-actuated levers for coupling the clutches, and a cam 88 controlling the movements of said levers, substantially as described.

21. The combination with an impression-cylinder and feeding-rolls between which the tympan is intermediately stretched over the impression-surface of said cylinder, of a driving-shaft therefor, gearing connecting said shaft and the shafts of the feeding-rolls, an intermediate reversing-coupling for causing said driving-shaft to rotate the feeding-rolls in either direction, and means shifting said coupling, whereby the feeding movement of of said rolls is made in opposite directions during alternate periods, substantially as described.

22. The combination with shaft 64, a driving-clutch therefor, and lever 86, for operating said clutch, of brake-shoe 20, its rock-arm 29 and driving-stud 5, and means adjustably connecting said stud 5 with the lever 86, substantially as described.

23. The combination with shaft 64, lever 86, brake-shoe 20, of the arm 23 carrying the brake-shoe, eccentric 21 on which arm 23 is hung, rock-arm 29 on the eccentric 21, and connections between lever 86 and rock-arm 29, substantially as described.

24. The combination with the clutch Z, its operating-lever 86, its shaft 64 and gearing connecting said shaft with the feeding-rolls, of a clutching mechanism interposed between said shaft and gearing, a cam 56 and a reversing mechanism therefor, substantially as described.

25. The combination with the shaft 90 and means operated thereby to change the driving direction of the gearing transmitting the movement of the shaft 64, of the cam 88 operating the clutches X, Y, of a compound ratchet mechanism making a predetermined number of impulses and applying the last to move a pin into engagement with a tumbler-cam operating said shaft 90 to reverse the direction of movement of the tympan-shifting devices, substantially as described.

26. The combination with the clutch Z and the shaft 64 which it moves and the lever 86 of said clutch, of the cam 83, formed to actuate the lever 86 at a certain time with relation to the operation of the machine and means for sliding said cam into and out of active relation to said lever, substantially as described.

In testimony whereof we have hereunto set our hands in the presence of two subscribing witnesses.

LUTHER C. CROWELL.
THOMAS M. NORTH.

Witnesses:
F. W. H. CRANE,
E. L. SPEIR.